United States Patent [19]

Nagano

[11] Patent Number: 5,020,387
[45] Date of Patent: Jun. 4, 1991

[54] LEVER SHIFTING DEVICE FOR A BICYCLE

[75] Inventor: Masashi Nagano, Izumi, Japan

[73] Assignee: Shimano Industrial Company, Ltd., Osaka, Japan

[21] Appl. No.: 836,420

[22] Filed: Mar. 5, 1986

[30] Foreign Application Priority Data

Mar. 7, 1985 [JP] Japan .................................. 60-45150
Mar. 7, 1985 [JP] Japan .................................. 60-45151

[51] Int. Cl.$^5$ ............................................ B60K 20/04
[52] U.S. Cl. ...................................... 74/475; 74/527; 74/502.2
[58] Field of Search .................. 74/475, 489, 506, 527

[56] References Cited

U.S. PATENT DOCUMENTS

| 3,362,238 | 1/1968 | Hayashi et al. | |
|---|---|---|---|
| 3,394,604 | 7/1968 | Kimura | |
| 3,595,351 | 7/1971 | Ishida | 74/506 |
| 3,886,806 | 6/1975 | Nagano | |
| 3,943,794 | 3/1976 | Shimada | 74/489 X |
| 4,267,744 | 5/1981 | Yamasaki | 74/475 |
| 4,270,481 | 6/1981 | Watarai | 74/475 X |
| 4,343,201 | 8/1982 | Shimano | 74/475 |
| 4,454,784 | 6/1984 | Shimano | 74/475 |
| 4,470,823 | 9/1984 | Shimano | 74/475 |
| 4,521,650 | 6/1985 | Oswald | 74/475 |
| 4,628,759 | 12/1986 | Kobayashi et al. | 74/506 |

FOREIGN PATENT DOCUMENTS

| 0157983 | 10/1985 | European Pat. Off. | |
|---|---|---|---|
| 2337096 | 1/1974 | Fed. Rep. of Germany | 74/489 |
| 2385581 | 12/1978 | France | 74/489 |
| 26436 | of 1910 | United Kingdom | 74/489 |

Primary Examiner—Randolph A. Reese
Assistant Examiner—Bartczak
Attorney, Agent, or Firm—Dickstein, Shapiro & Morin

[57] ABSTRACT

A lever shifting device for a bicycle for operating a bicycle derailleur having a return spring and provided with a positioning mechanism having a positioning member which rotates in association with an operating lever to set the speed change stage of the derailleur is disclosed. Between a fixing member and the positioning member is provided an auxiliary spring, so that the operating lever can be lightly operated against the return spring.

8 Claims, 5 Drawing Sheets

LEVER SHIFTING DEVICE FOR A BICYCLE

FIELD OF THE INVENTION

The present invention relates to a lever shifting device for a bicycle, and more particularly to a lever shifting device for operating a derailleur having a return spring.

BACKGROUND OF THE INVENTION

The lever shifting device for a bicycle, as shown in the Japanese Utility Model Application Gazette No. Sho 57-111,698, comprises an operating lever supported rotatably to a fixing member fixed to a bicycle frame and a positioning mechanism including a positioning member rotatable in association with the operating lever and having a plurality of engaging positions to set the speed change stage of the derailleur and an engaging member supported to the fixing member and engageable with at least one engaging position, thereby ensuring the positioning of the lever at a desired speed change stage.

In order to ensure the positioning condition of the lever, a larger resistance overcoming the return spring of the derailleur must be applied between the positioning member and the engaging member. Hence, the operating lever, when intended to operate against the return spring, should be operated with a larger force than the sum of resistance of the positioning mechanism and the biasing force of the return spring, resulting in poor speed-change efficiency.

SUMMARY OF THE INVENTION

In the light of the above problem, the present invention has been designed. An object thereof is to provide a speed-controlling device provided with an auxiliary spring working in the reverse direction to the biasing direction of the return spring of the derailleur, thereby reducing the force required for forwardly operating the lever permitting a light operating force to efficiently change the derailleur and hence the speed of the bicycle.

The lever shifting device of the invention comprises a fixing member fixed to the bicycle frame, an operating lever supported rotatably to the fixing member, and a positioning mechanism provided with a positioning member rotatable in association with the operating lever to set the derailleur in a desired speed change stage, and an auxiliary spring positioned between the positioning member and the fixing member so that the auxiliary spring biases the positioning member opposite to the biasing direction of the return spring of the derailleur.

Thus, the operating lever is operable against the return spring by a force which includes the sum of rotational resistance of the positioning mechanism and the biasing force of the return spring less the biasing force of the auxiliary spring whereby the forwardly operating force for the lever is smaller to the extent of the biasing force of the auxiliary spring in comparison with conventional devices having no auxiliary spring.

Hence, the lever shifting device of the invention can operate the operating lever with a light touch against the return spring as well as setting a desired speed-change stage of the derailleur by the positioning mechanism.

The positioning mechanism of the present invention includes a plurality of engaging positions and engaging members, each engageable with one engaging position. The positioning mechanism may carry the engaging members, but mainly carries the engaging positions, the engaging members together with a spring member being supported to the fixing member.

In a case where the engaging positions are provided at the positioning member, friction portions also may be provided thereon and the fixing member may be provided with a switching means which switches the engaging members between the operating positions of the positioning mechanism for engaging the engaging members with the engaging positions and a friction mechanism for engaging the engaging members with the friction portions.

In the present invention, gaps are formed at the association portion of the operating lever with the positioning member, thereby compensating the over shift of the lever, Hence, the over-shift of the operating lever with respect to the positioning member ensures the speed change. In this case, the operating lever over-shift is restored to an extent of each gap by the return spring with respect to the positioning member, without being affected by the auxiliary spring.

Furthermore, the present invention is provided with a strength balance means which, when the operating lever is biased by the auxiliary spring and against the return spring, balances an operating force of the lever from its initial position (for example, the top gear) to its terminal position (for example, the low gear). Thus, the operating force of the lever is balanced between the low gear and the top gear, thereby further improving the speed-change efficiency.

The strength balance means is so constructed that the desired balance is effected. For example, a control wire winding groove at the outer periphery of the boss of the operating lever is made smaller in a coil diameter along the biasing direction of the auxiliary spring so that the distance between the groove and the lever operating portion differs between the top gear and the low gear. In other words, a lever ratio at the low gear side is made larger, or engaging resistance between the engaging portion and the engaging member engageable therewith is reduced along the biasing direction of the auxiliary spring, that is, reverse to a biasing direction of the return spring.

The above and further objects and novel features of the invention will more fully apparent from the following detailed description when read in connection with the accompanying drawings.

DETAILED DESCRIPTION OF THE INVENTION

Figure 1:
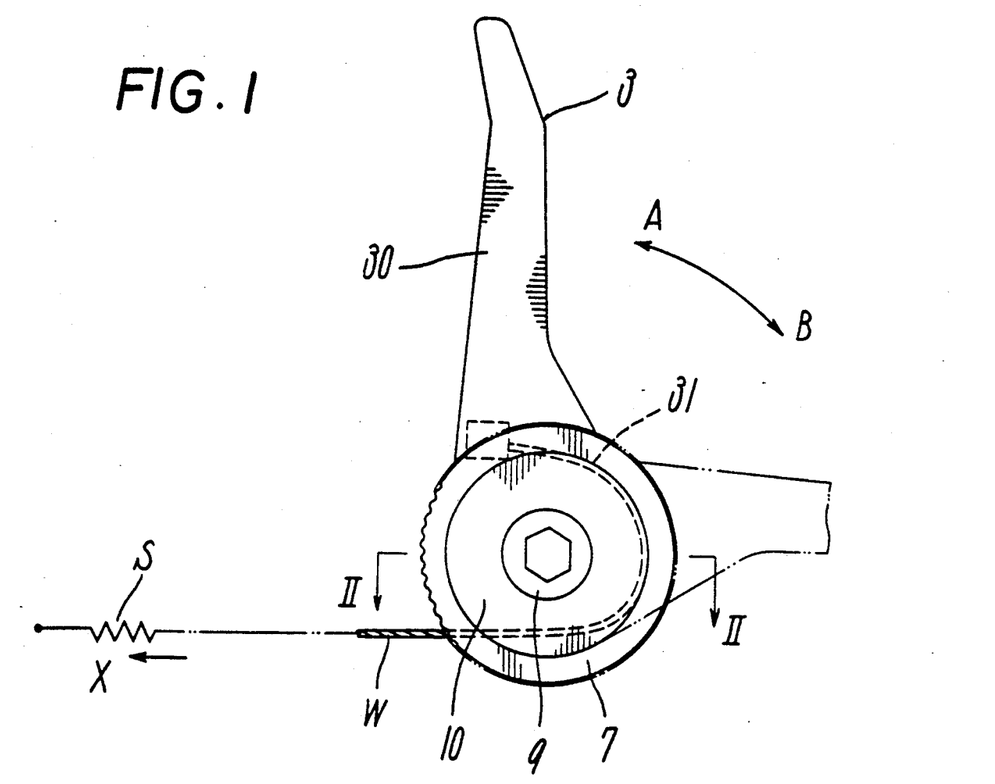
FIG. 1 is a schematic front view of an embodiment of a lever shifting device for a bicycle of the invention.
Figure 2:
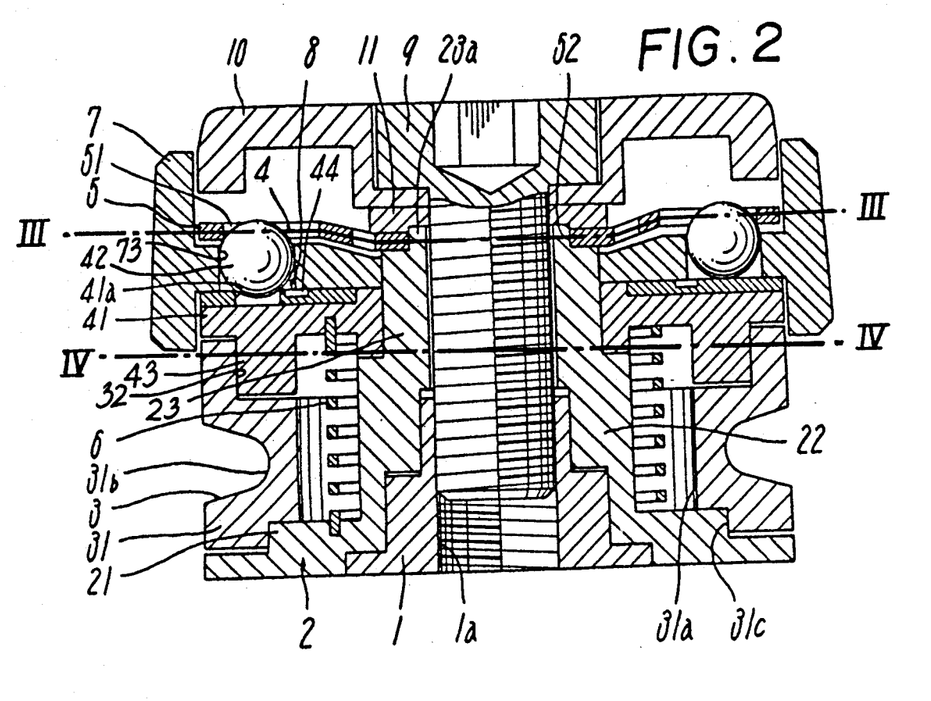
FIG. 2 is an enlarged longitudinal sectional view taken on the line II—II in FIG. 1.

Referring to FIGS. 1 and 2, a lever shifting device is shown which is used together with a multistage sprocket assembly (not shown) mounted on a rear hub of the bicycle and connects through a control wire W with a derailleur (not shown) for shifting a driving chain to a desired one of the multistage sprockets to thereby operate the derailleur. The lever shifting device is provided with a fixing member 2 fixed to a base 1 welded to the bicycle frame, or directly thereto through a fixing means, such as a band, an operating lever 3 supported rotatably to the fixing member 2, and a positioning mechanism 4. The lever 3 is operated forwardly in the direction A reverse to the biasing direction X of a return spring S at the derailleur, so that a driving chain guided by a chain guide at the derailleur is shifted from a small diameter high-speed sprocket to a larger diameter low-speed sprocket at the multistage sprocket assembly, and the operating lever 3 is operated backwardly in the direction B similar to the biasing direction X of the return spring S to restore the chain guide by a biasing force of return spring S, thereby shifting the chain from a low speed sprocket to a high-speed one.

In addition, the return spring is adapted to increase its biasing force as the amount of forward operation of the lever increases, thereby increasing the operating force of the lever.

The fixing member 2 is a cylindrical member comprising a larger diameter shaft portion 21 for supporting the lever 3, a middle diameter shaft portion 22 in continuation of the larger diameter shaft portion 21 through a stepped portion, and a smaller diameter shaft portion 23 in continuation of the middle diameter shaft portion 22 through a stepped portion. The operating lever 3 comprises a cylindrical boss 31 having a center bore 31a and a wire winding groove 31b at the outer periphery and an operating portion 30 extending radially outwardly from one side of the boss 31, the center bore 31a having at one end opening a fitting portion 31c to be fitted onto the larger diameter shaft portion 21.

The positioning mechanism 4 comprises a positioning member 41 having a plurality of engaging portions 41a and engaging members 42 each engageable with one engaging portion 41a, the positioning member 41 being supported rotatably to the smaller diameter shaft portion 23, the engaging members 42 being supported so that it is non-rotatable but radially movable during operation relative to the fixing member 2 through a leaf spring 5, and biased thereby toward the engaging portions 41a, thus applying to the rotation of positioning member 41 a rotational resistance overcoming the return spring S.

Figure 4:
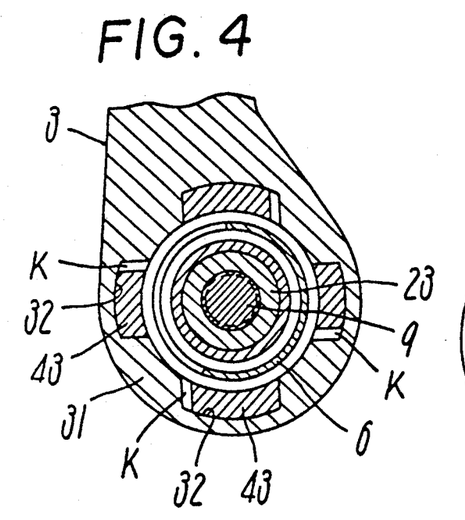
FIG. 4 is a sectional view of an association portion of an operating lever with a positioning member, taken along section IV—IV in FIG. 2

Also, four engaging recesses 32, as shown in FIG. 4, are formed around the center bore 31a and disposed in continuation thereof. At the lower surface of the positioning member 41 and near the outer periphery thereof are provided four engaging projections 43 engageable with the engaging recesses 32, the engaging projections 43 engaging with the recesses 32 respectively to associate the positioning member 41 with the rotation of the lever 3.

In the embodiment shown in FIGS. 1 and 2, between the positioning member 41 and the fixing member 2 is provided an auxiliary spring 6 which biases the positioning member 41 reversely to the biasing direction X of the return spring S, so that the auxiliary spring 6 can reduce an operating force necessary for the forward operation of the lever 3.

The auxiliary spring 6 is formed of a coiled spring, inserted into a space between the center bore 31a at the boss 31 and the outer peripheral surface of the middle diameter shaft portion 22, and retained at one end to the positioning member 41 and at the other end to the stepped portion between the larger diameter shaft portion 21 and the middle diameter shaft portion 22.

Also, the auxiliary spring 6, which biases the operating lever 3 against the return spring S, decreases in biasing force as the amount of the forward operation of the lever 3 increases.

Figure 3:
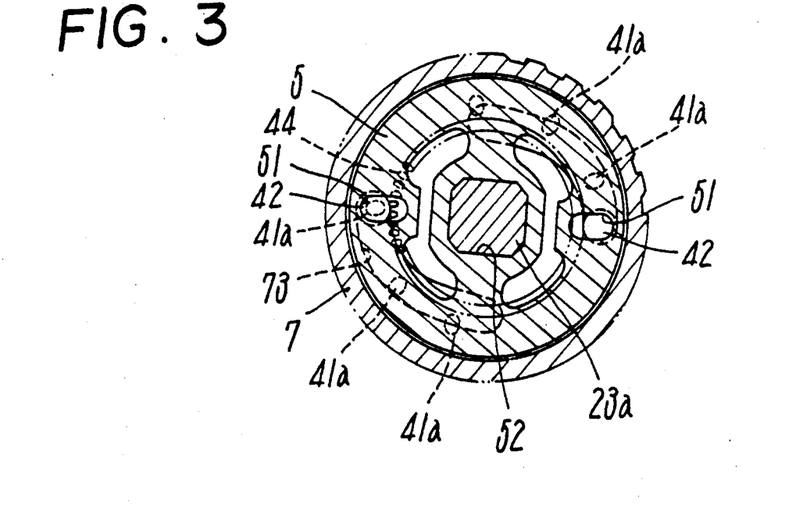
FIG. 3 is a cross-sectional plan view of a leaf spring, taken along section III—III in FIG. 2
Figure 5:
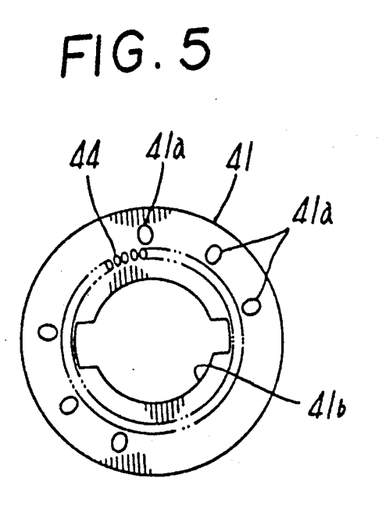
FIG. 5 is a plan view of the positioning member only.

The positioning member 41 is substantially disc shaped as a whole and provided at the center with a through bore 41b to be fitted onto the smaller diameter shaft portion 23 and at the upper surface with a plurality of engaging portions 41a circumferentially spaced at predetermined intervals and with friction portions comprising a number of recesses disposed circumferentially and radially inwardly from the engaging portions 41a as shown in FIGS. 3 and 5. Each engaging portion 41a is a through bore, but may alternatively be a recess.

Also, each engaging member 42 uses a ball, but may alternatively use a roller.

The leaf spring 5, as shown in FIG. 3, is disc-shaped, has a non-cylindrical engaging bore 52 to be fitted non-rotatably onto a non-cylindrical shaft portion 23a at the smaller diameter shaft portion 23 of the fixing member 2, and is provided at the portion opposite to each engaging member 42 with an elongate holding portion 51 extending radially of the leaf spring 51. The engaging members 42 are held on the holding portions 5 respectively to be movable only radially of the fixing member 2.

Each engaging member 42 moves radially of the fixing member 2, thereby engaging with the engaging portion 41a to thereby position the lever 3 and also with the friction portion 44 to thereby apply friction to the operating lever 3. Thus, the respective engaging members 42 are adapted to be switched by a switching means comprising an operating member 7 fitted rotatably onto the smaller diameter shaft portion 23, between the operating position of the positioning mechanism 4 for engaging the engaging members 42 with the engaging portions 41a and that of a friction mechanism 8 for engaging the same with the friction portions 44.

The friction mechanism 8 comprises the friction portions 44 at the positioning member 41, engaging members 42 and leaf spring 5. The operating member 7 is rotated to move the engaging members 42 along the holding portions 51 and radially inwardly of the positioning member 41, thereby engaging the engaging members 42 with the friction portions 44 respectively. Hence, a predetermined friction is applied to the rotation of the positioning member 41. In turn the rotation of the lever is rotatable in association with the positioning member 41.

Figure 6:
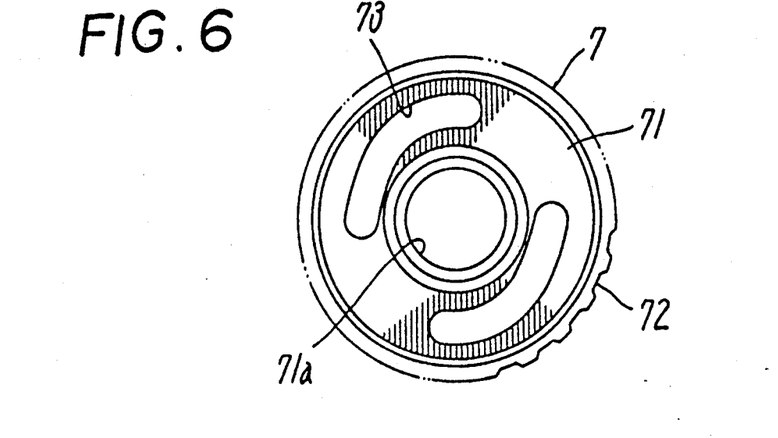
FIG. 6 is a plan view of an operating member only.
Figure 7:
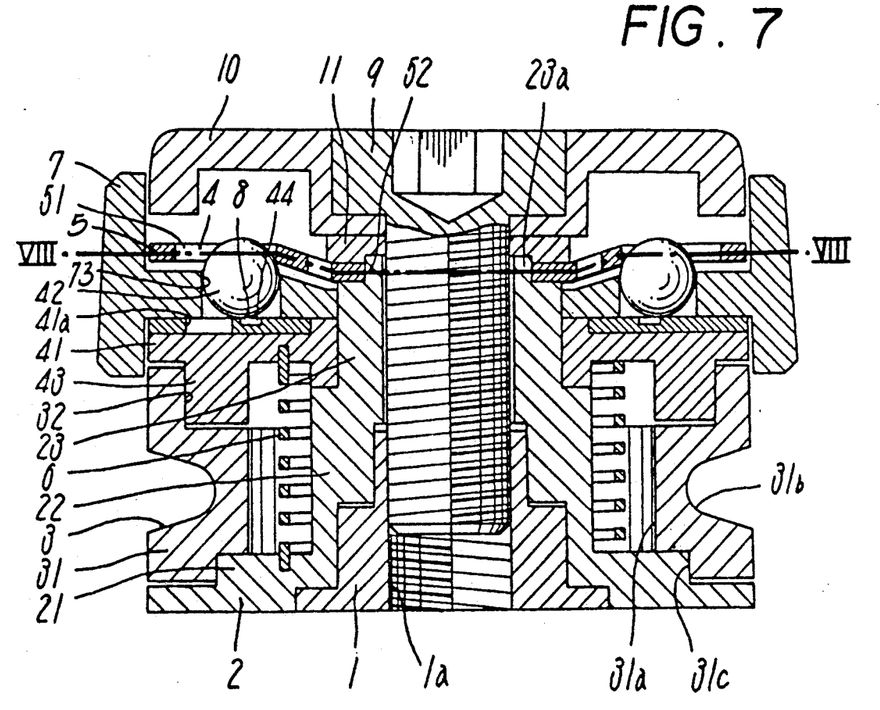
FIGS. 7 and 8 are illustrations of switching the operating lever from the operating state of a positioning mechanism to that of a friction mechanism, corresponding to FIGS. 2 and 3, with FIG. 8 being taken along section VIII—VIII in FIG. 7.

The operating member 7, as shown in FIG. 6, comprises a disc 71 having a through bore 71a rotatably fitted onto the smaller diameter shaft portion 23 and a cylindrical operating portion 72, the disc 71 being provided with guide bore 73 extending circumferentially and radially inwardly from the portions opposite to the engaging members 42, so that the operating member 7 rotates to move the engaging members 42 only radially of the positioning member 41 along the holding portions 51 respectively.

In FIGS. 1 and 2, reference numeral 9 designates a screw threadedly engageable with a threaded bore 1a provided at the base 1 so as to fix the fixing member. Reference numeral 10 designates a cover covering the positioning mechanism 4, and 11 designates a washer for pushing the leaf spring 5.

The lever shifting device of the invention constructed as described above winds a control wire W onto the outer periphery of the boss 31 of the operating lever 3 and retains one end of the wire W to the boss 31 so that the operating lever 3 connecting with, for example, a linkage member at the derailleur is turned forwardly or backwardly to swing the linkage member, thereby shifting the driving chain to a desired sprocket through the chain guide for changing the bicycle speed at the predetermined stage.

The operating lever 3, when turned forwardly, freely rotates by a width of each gap K against the return spring S. The end faces of engaging projections 43 engage with the engaging recesses 32 respectively to thereby integrally connect the lever 3 and positioning member 41. In addition, when the gap K is not formed, the operating lever 3 does not freely rotate with respect to the positioning member 41, but the latter moves in association with the rotation of lever 3.

When the operating lever 3 is further forwardly operated from the integral state of the lever 3 with the positioning member 41, the return spring S increases in the deflection and biasing force for restoring the lever 3, but the lever 3 is turned forward by a light touch by means of the biasing force of the auxiliary spring 6.

An operating force for forward movement of the lever 3 need only be a force $F_1 - F_2 + R$, where $F_1$ is a biasing force of the return spring S, $F_2$ is that of the auxiliary spring 6, and R is a rotational resistance of the positioning member 41. As a result, the forwardly operating force for the lever 3 can be reduced only by the biasing force of the auxiliary spring 6 in comparison with the conventional lever shifting device which must operate the lever 3 by a force overcoming $F_1 + R$, thereby enabling the lever 3 to be operated to that extent by a light touch.

The lever 3, when forwardly operated to allow the engaging members 42 to move beyond the boundary between the engaging portions 41a and engage with those at the low gear side, operates progressively by a width of each gap K, whereby the chain guide shifts over with respect to a desired sprocket at the multistage sprocket assembly to thereby ensure engagement of the chain with the desired sprocket.

Then, the lever 3, when released, is restored by the return spring S only by the width of each gap K with respect to the positioning member 41, thereby being held at the proper position set by the positioning mechanism 4.

The lever 3, when backwardly operated in the biasing direction of the return spring S, is subjected to the force $F_1 - F_2 + R$ in the same manner as when forwardly operated.

In the latter case, the operating force for backward operation of the lever 3 is larger by the biasing force of auxiliary spring 6 than the conventional device which operates the same by the force $F_1 - R$, but the operating force for the backward operation of the lever 3 is much smaller than that for forward operation, whereby the speed change efficiency is not affected by the backwardly operating force increased by the biasing force of auxiliary spring 6.

The lever shifting device is switched from the operating state of the positioning mechanism 4 to that of the friction mechanism 8 in such a manner that the operating member 7 is rotated clockwise in FIG. 3 to move each engaging member 42 through the guide bore 73 along the holding portion 51 at the leaf spring 5 and radially inwardly of the positioning member 41, so that each engaging member 42 disengages from the engaging portion 41a to make the positioning mechanism 4 inoperable. Each engaging member 42 engages with the friction portion 44 so as to apply thereto the predetermined friction thereby operating the friction mechanism 8.

Hence, the lever 3 can be operated by the friction mechanism 8 and kept thereby in the lever operating position.

On the other hand, when the operating member 7 is rotated counterclockwise in FIG. 3 so that each engaging member 42 is moved through the guide bore 73 along the holding portion 51 radially outwardly of the positioning member 41 so that the engaging portion 42 disengages from the friction portion 44 to make the friction mechanism 8 in operable, the engaging members engage with the engaging portions 41a to thereby put the positioning mechanism 4 in an operating state. Hence, the lever shifting device is switched from an operating state of the friction mechanism 8 to that of the positioning mechanism 4.

In the above-mentioned construction of the lever shifting device, since the friction portions 44 are provided at the positioning member 41 and are engageable with the engaging members 42, the friction mechanism 8 is simple in construction and the device provided therewith is small-sized.

Alternatively, the positioning member 41 may hold the engaging members 42, or may be formed in a plate having at least one engaging projection (not shown) instead of the engaging member. In brief, the positioning member 41 need only rotate in association with the lever 3 to enable the speed change stage at the derailleur to be set. In the above case, a plurality of engaging portions engageable with the engaging members or the engaging projection are provided at the side of fixing member 2.

The auxiliary spring 6 in the above construction, which reduces the operating force for the forward operation of the lever 3 as above-mentioned, has the spring characteristic of acting opposite to the return spring S, so that when the lever 3 is forwardly operated in the direction of the arrow A from the top gear side to the low gear side, the biasing force of return spring S increases, but that of auxiliary spring 6 decreases. Hence, although the lever 3 can be operated more lightly than when the auxiliary spring 6 is not provided, the difference between the operating forces at the top and low gear sides becomes larger. In order to eliminate such defect, it is preferable to provide a strength balance means.

Figures 8, 9:
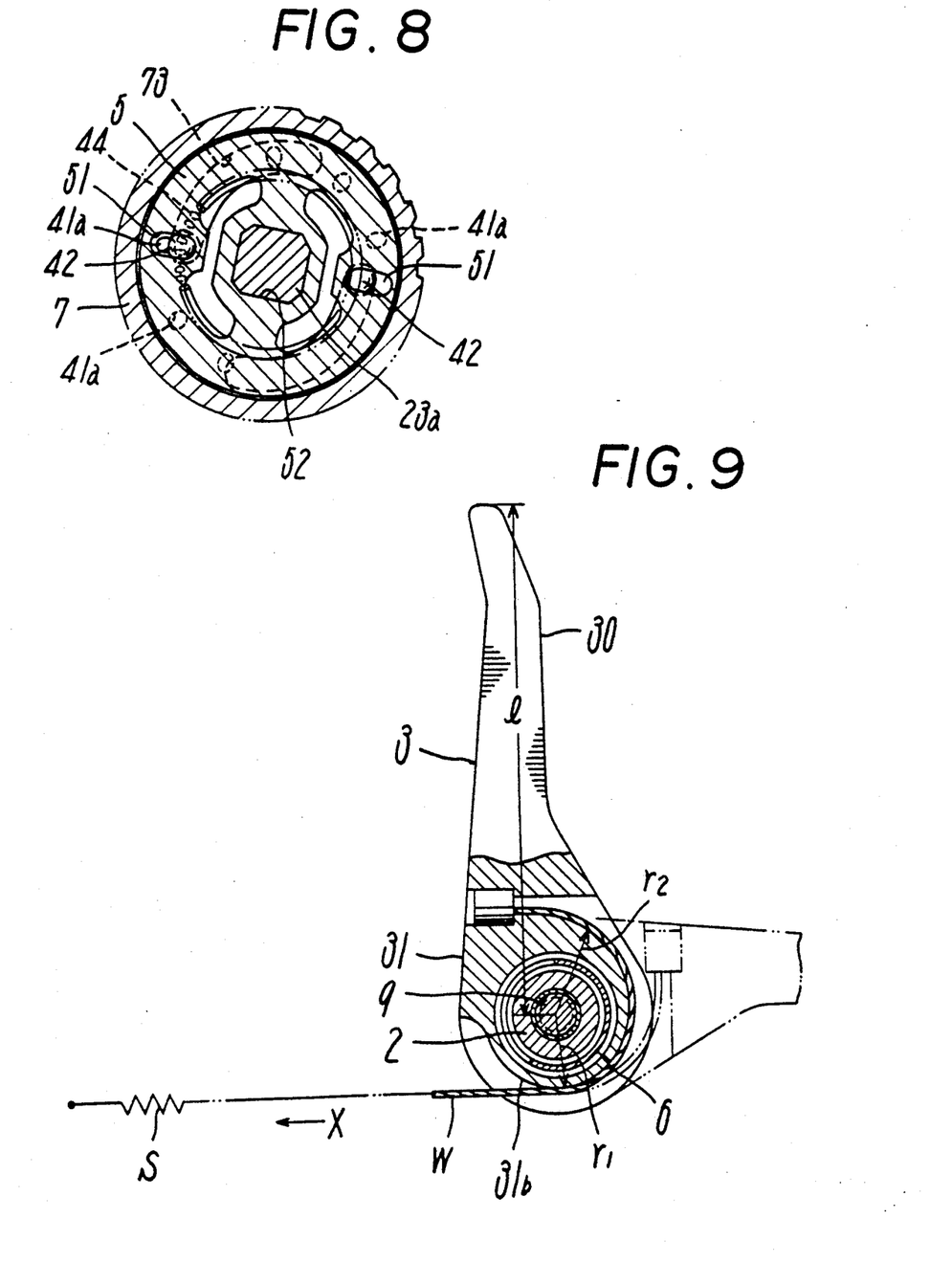
FIG. 9 is a partially cutaway front view of a modified embodiment of the invention.

The strength balance means, as shown in FIG. 9, is so constructed that a wire winding groove 31b provided at the outer periphery of the boss 31 is reduced in its coil diameter along the biasing direction (in the direction of the arrow X) of the return spring S. A coil radius $r_1$ at the low gear side is made smaller than coil radius $r_2$ at the top gear side, thereby making a lever ratio at the low gear side larger than that at the top gear side. Hence, when an input for the forward operation of the lever 3 is constant, an output thereof at the low gear side is made larger than that at the top gear side. Accordingly, a difference between the outputs can reduce the operating force at the low gear side, thereby enabling the operating forces at the low and top gear sides to be balanced.

Alternatively, the strength balance means may be constructed to vary resistance against engagement of the engaging portions 41a with the engaging members 42, at the top gear side and the low gear side, thereby reducing the engaging resistance as the speed change stage shifts from the top gear side to the low gear side.

In this case, the force overcoming the resistance against engagement at the low gear side can be smaller to an extent corresponding to the difference in the engaging resistances than that at the top gear side.

Figure 10:
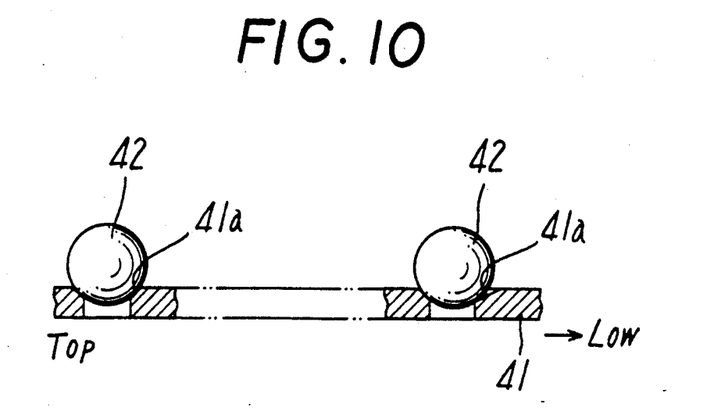
FIG. 10 is an illustration of an embodiment of a strength balance means.
Figure 11:
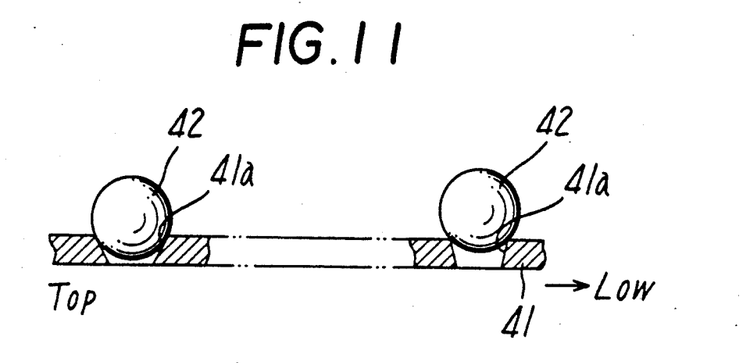
FIG. 11 is an illustration of another embodiment thereof.
Figure 12:
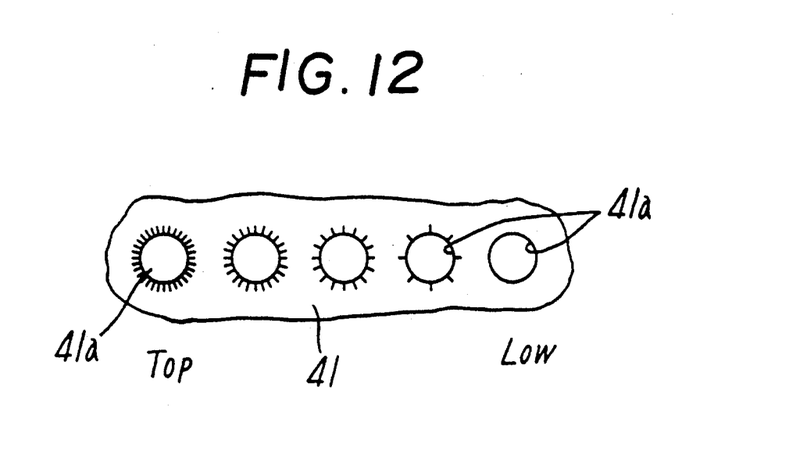
FIG. 12 is a further embodiment of the same.

Alternatively, the engaging resistance changing means may, for example as shown in FIG. 10, be so constructed that the surface of the engaging portion 41a engaging with the engaging member 42 is slanted at the low gear side, in other words, the engaging surface positioned opposite to the biasing direction of the return spring S gradually slopes at an angle of inclination from the top gear side to the low gear side. It may, as shown in FIG. 11, be varied in a bore diameter or a depth of the engaging portion 41a to be gradually smaller from the top gear side to the low gear side; or may, as shown in FIG. 12, be varied in roughness at the surface of the engaging portion 41a in a manner of being gradually reduced from the top gear side to the low gear side.

Also, the gap K provided between the operating lever 3 and the positioning member 41 is not indispensable.

The lever shifting device of the invention may be used for a front derailleur rather than the rear derailleur.

As seen from the above, the auxiliary spring 6 provided between the positioning member 41 and the fixing member 2 acts on the operating lever 3 when forwardly operated, whereby the sum of the biasing force of the return spring S from which that of the auxiliary spring 3 is subtracted and the rotational resistance of the positioning member 41 need only be applied to the forward movement of the lever 3, thereby permitting operation of the lever 3 more lightly than in the conventional device.

Also, the gap K is provided at the association portion of the lever 3 with the positioning member 41 enabling the overshift of the chain guide and the restoration of lever 3 reliably to the extent of the gap K without being affected by the auxiliary spring 6.

Furthermore, the strength balance means can balance the operating forces at the initial position of the lever operation, that is, the top gear side, and at the terminal position of the same, that is, the low gear side, thereby further improving the speed change efficiency.

Although several embodiments have been described, they are merely exemplary of the invention and not to be construed as limiting, the invention being defined solely by the appended claims.

What is claimed is:

1. A lever shifting device for operating a derailleur having a return spring, said device comprising a fixing member, an operating lever supported rotatably on said fixing member, a positioning mechanism having a positioning member rotatable in association with said operating lever so as to set the speed change stage of said derailleur, and an auxiliary spring positioned between said fixing member and said positioning member which biases said operating lever in a direction opposite to a biasing direction of said return spring of said derailleur.

2. A lever shifting device for a bicycle according to claim 1, wherein said positioning member is provided with friction portions and a plurality of engaging portions and at least one engaging member engageable with one of said engaging portions and said device further comprises a spring member for biasing said engaging member toward said positioning member, and said fixing member is provided with switching means for switching said at least one engaging member from an operating position of said positioning mechanism where said at least one engaging member engages with said one of said engaging portions to an operating position of said positioning mechanism where said at least one engaging member engages with said friction portions respectively.

3. A lever shifting device for a bicycle according to claim 2, wherein each of said engaging portions has an engaging surface which is engageable with said engaging member of said positioning mechanism, a said engaging surface of one of said engaging portions which is disposed relatively far from a position at which a derailleur control wire is drawn out from said shifting device provides a smaller resistance against engagement of said engaging member with said engaging portion than is provided by a said engaging surface of one of said engaging portions which is disposed relatively close to a position at which said control wire is drawn out from said shifting device.

4. A lever shifting device for a bicycle according to claim 3, wherein respective engaging surfaces of said engaging portions provide a relatively smaller resistance against engagement of said engaging member with a respective engaging portion the farther a respective engaging portion is disposed from said position at which said control wire is drawn out from said shifting device.

5. A lever shifting device for a bicycle according to claim 1, wherein the association of said operating lever with said positioning member produces a gap therebetween for compensating the over-shift of said operating lever.

6. A lever shifting device for a bicycle according to claim 1 including strength balance means which, when said operating lever is operated in the biasing direction of said auxiliary spring reversely to the biasing direction of said return spring, balances said operating force for said operating lever between the operation initiating position and the operation terminating position of said operating lever.

7. A lever shifting device for a bicycle according to claim 6, wherein said operating lever has a wire winding groove for winding therein a control wire connected to said derailleur, said wire winding groove having a smaller coil radius at a position relatively near to a position at which a derailleur control wire is drawn out from said shifting device than at a position relatively far from said position at which said control wire is drawn out from said shifting device, so that an operating force for operating said operating lever opposite to the biasing direction of said return spring is adapted to be balanced between the initial and terminal positions of said operating lever.

8. A lever shifting device for a bicycle according to claim 7, wherein said coil radius gradually increases from said position relatively near to said position at which said control wire is drawn out from said shifting device to said position relatively far from said position at which said control wire is drawn out from said shifting device.

* * * * *